July 4, 1950 — B. L. SHREINER — 2,514,098
MEAT AND FOWL TURNER AND LIFTER
Filed Nov. 6, 1947

Inventor
Byron L. Shreiner
By Mason & Wyss
Attys.

Patented July 4, 1950

2,514,098

UNITED STATES PATENT OFFICE 2,514,098

MEAT AND FOWL TURNER AND LIFTER

Byron L. Shreiner, Evanston, Ill.

Application November 6, 1947, Serial No. 784,321

4 Claims. (Cl. 294—1)

The present invention relates primarily to a roast turner and lifter whereby meat such as a roast or a fowl being roasted may be turned or lifted while being cooked without completely removing the same from the pan or container in which it is being cooked or roasted.

It has been a major problem for housewives in preparing large roasts and particularly in roasting fowl such as a turkey to turn the roast as is required during the cooking process so that all sides thereof may be appropriately browned and the like. With a roast for example the problem is not as great since turning thereof may be accomplished by means of a large fork or the like. However, this is not possible when roasting a turkey or other fowl since damage to the roasting fowl results with the consequent unsatisfactory appearance thereof as well as less satisfactory cooking or roasting thereof. Various devices have been suggested heretofore for turning and lifting such roasting objects, particularly roasting fowl. However, such devices have generally been made of flexible metal members such as stainless steel, and in addition to becoming very hot so as to require the use of hot pot holders or the like, they present a very difficult cleaning problem after use thereof. Also the problem of storage when not in use of such prior art devices is fairly complicated. It would be desirable to provide a roast turner in which the cleaning problem is greatly simplified and in which the storage problem is no more complicated than that of storing any very small kitchen utensil. It would furthermore be desirable to provide a device of this character which is simple and foolproof in use and wherein complicated shaped parts are completely dispensed with.

Accordingly it is an object of the present invention to provide a new and improved roast or fowl turner which overcomes the disadvantages of prior art arrangements enumerated above.

It is another object of the present invention to provide a new and improved means by which fowl or other roasting meat may be turned or rotated during the process of cooking so that all sides thereof may be evenly browned and cooked and when the cooking process has been completed the device may be utilized to remove the cooked material from the vessel in which it has been cooked or roasted.

Still another object of the present invention is to provide a device of the above character which is simple in construction, inexpensive to manufacture and very simple to clean and store.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawing in which.

Figure 1:
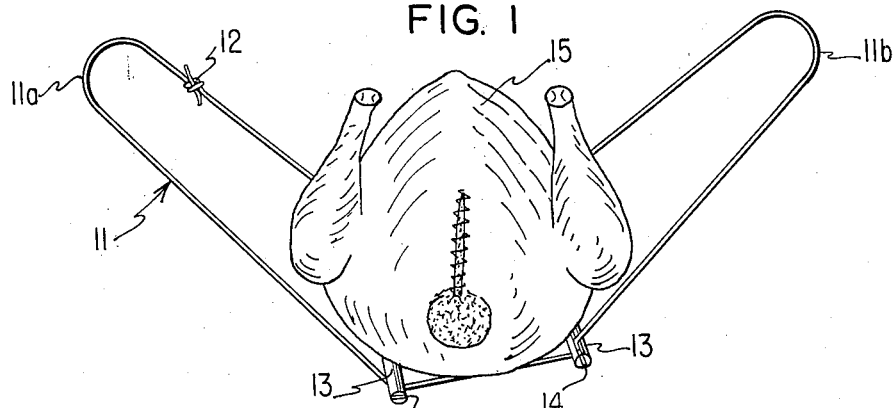
Fig. 1 is a perspective view showing how the device of the present invention may be used to manipulate a roasting object such as a fowl.

Referring now to the drawings there is illustrated a sling generally indicated at 10 of a form so as to be readily used for lifting or turning a roast during the cooking process and particularly adaptable when a fowl such as a turkey or the like is being roasted. This sling 10 as illustrated comprises an endless loop 11 formed of disposable, flexible non heat-conducting material preferably of cord or string which is always available around any household. As illustrated this loop 11 may be formed by knotting together the ends of a string in an endless loop or by employing a suitable clamp for connecting the ends. Any suitable means for joining the same such as the knot 12 shown in the drawings may be employed.

Figure 2:
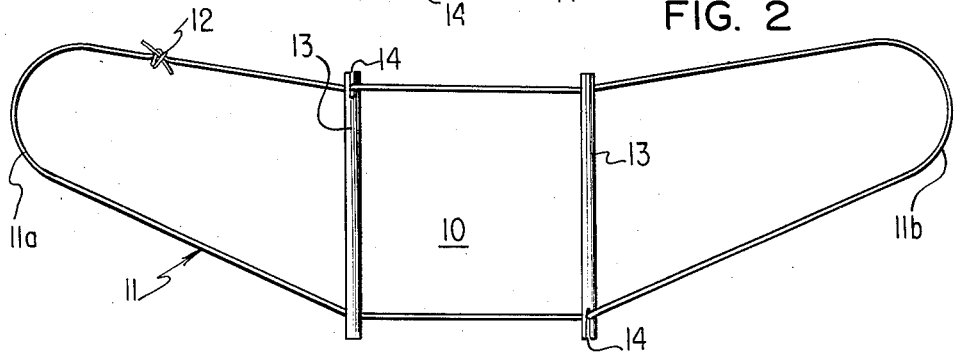
Fig. 2 is a perspective view of a sling embodying the present invention.
Figure 3:
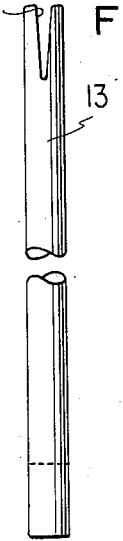
Fig. 3 is an enlarged view of a portion of the sling of the present invention.

For the purpose of forming a sling from the endless loop 11 which may readily support a fowl or a roast there are provided a pair of struts or spacer members 13 of identical configuration best shown in Fig. 3 of the drawings. Each of the struts 13 is provided at its respective ends with means defining notches 14 extending along the longitudinal axis of the struts 13 which struts are preferably in the form of rods having a circular cross section. The notches or slots 14 are preferably narrowed at the portion remote from the ends of the rods 13 so as to receive and clampingly engage the cord in the form of a loop 11. The notches 14 at opposite ends of each rod are preferably displaced with respect to each other by a substantial angle of the order of 90°. By applying the rods or struts 13 to the endless loop 11 in a reversed manner as indicated clearly in Fig. 2 a binding action between the cord and the notches is provided to insure proper positioning of the parts of the sling. Also a more satisfactory action on the object to be turned is obtained by this arrangement. It will be apparent that the struts or rods 13 can be positioned in the manner shown in Figs. 1 and 2 of the drawing so that opposite ends of the rods 13 engage spaced points along one side of the loop 11 and the other ends of the rods 13 engage spaced points on the other side of the loop 11.

Preferably the rods 13 are made of stainless steel, aluminum or some other material which can readily be cleaned and provides a permanent element. It will be apparent that only the two rods 13 need be stored, which require a very small amount of space and obviously can be kept in any utensil drawer wherein articles such as knives, forks or the like are retained. When it is desired to use the sling the rods 13 are assembled with a piece of cord which has been tied in the form of the endless loop 11 so as to accommodate an object to be cooked or roasted indicated generally by the reference numeral 15 in the drawings. It will be apparent that the operator can lift or lower one end of the sling relative to the other end so as to cause movement in the form of rolling or turning of the object 15.

Figure 4:
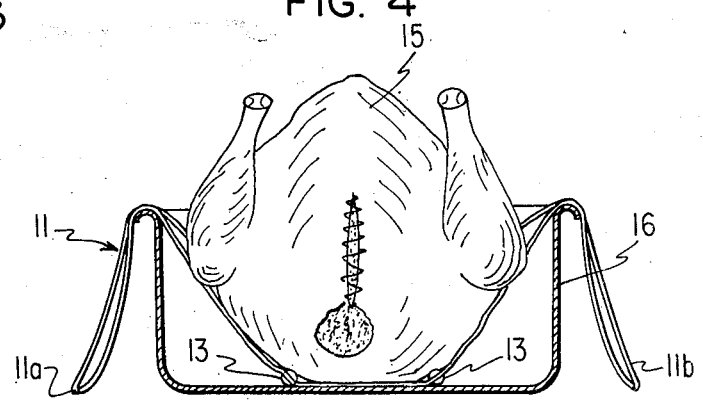
Fig. 4 is a cross sectional view of a pan in which a fowl is being roasted showing the position of the roast turner of the present invention during such roasting operation.

During the cooking operation the ends of the sling in the form of a cord can be draped over the edge of the pan as is clearly shown in Fig. 4 where the reference numeral 16 designates the roaster and the reference numeral 15 designates the fowl being roasted. It will be apparent that the ends 11a and 11b of the loop 11 may be permitted to extend outside the pan. Due to the fact that the cord in the form of the loop 11 is a very poor conductor of heat, the sling may be manipulated without employing hot pot holders or the like as was required by prior art arrangements. Furthermore when the turning process and lifting process has been completed the loop 11 may be disassembled from the rods or struts 13 in a very simple manner and disposed of so that the cleaning problem entails only the cleaning of the simple rods 13 which as was mentioned above can readily be stored. The complicated slings of the prior art although foldable into a small space entailed a storage problem since other utensils became entangled therewith.

In view of the detailed description included above the operation of the roast turner and lifter of the present invention will be obvious. In the use of the device the fowl or roast will be positioned between the struts 13 of the sling 10 as indicated best in Fig. 1 of the drawing. The ends of the loop 11 which essentially comprise the handles 11a and 11b will then be utilized to lift the fowl or roast into the roasting pan such as 16 for example and the handles may be folded over the fowl if desired or draped over the edges of the pan as indicated in Fig. 4 since the cord will be flexible to permit any desired positioning thereof. When it is desired to turn the fowl or roast during the cooking process the handles are grasped and one raised sufficiently above the other to rotate the fowl or roast the desired amount, whereupon the fowl and sling are replaced in the pan. This process is repeated so that all sides of the roast or fowl may be evenly cooked and browned as desired.

It will be apparent to those skilled in the art that the present invention is not limited to the particular construction and arrangement shown and described but that changes and modifications may be made without departing from the spirit and scope of the present invention. It is aimed in the appended claims to cover all such changes and modifications that fall within the true spirit and scope of the present invention.

What is claimed as new and desired to be secured by Letters Patent of the United States is:

1. A sling for turning a fowl or roast during the cooking process comprising an endless loop formed of disposable flexible nonheat-conducting material, a pair of rods, means for releasably fastening one end of each of said rods to spaced points on one side of said loop, and means for releasably fastening the other ends of each of said rods to spaced points on the other side of said loop opposite said first spaced points, said last two mentioned means comprising means defining slots in the ends of said rods for clampingly receiving said loop while permitting ready assembly and disassembly of said rods and loop.

2. A pair of rigid rods adapted for use in a sling formed of an endless loop of disposable cord for turning a roast or fowl during the cooking process, means defining a short slot at one end of each of said rods extending along the longitudinal axis thereof, and means defining a short slot at the other end of each of said rods extending along the longitudinal axis thereof, said slots being proportioned for clampingly receiving said cord to hold portions thereof in sufficient spaced relationship to support a roast or fowl thereon.

3. A sling for turning a fowl or roast during the cooking process comprising an endless disposable cord loop formed of a poor conductor of heat, a pair of rigid rods, means for fastening one end of each of said rods to spaced points on one side of said loop, and means for fastening the other ends of each of said rods to spaced points on the other side of said loop opposite said first spaced points, said last two mentioned means comprising means defining cut-away portions adjacent the ends of said rods for releasably receiving said disposable cord loop to form said sling, said cord being used only once and replaced with another cord upon subsequent use of said sling whereby only said rods need be cleaned and stored for subsequent use.

4. A sling for turning a fowl or roast during the cooking process comprising an endless cord loop, a pair of rods, means for fastening one end of each of said rods to spaced points on one side of said loop, and means for fastening the other ends of each of said rods to spaced points on the other side of said loop opposite said first spaced points, said last two mentioned means comprising means defining slots in the ends of said rods for clampingly receiving said cord loop while permitting ready assembly and disassembly of said rods and cord loop, said slots in the two ends of each rod being displaced from each other by an angle approaching 90 degrees.

BYRON L. SHREINER.

REFERENCES CITED

The following references are of record in the file of this patent:

UNITED STATES PATENTS

| Number | Name | Date |
| --- | --- | --- |
| 1,395,424 | Justus | Nov. 1, 1921 |
| 2,337,142 | Williams | Dec. 21, 1943 |